Sept. 26, 1944.　　C. H. LOCKWOOD　　2,358,864
WHEEL TRUCK
Filed Jan. 12, 1942
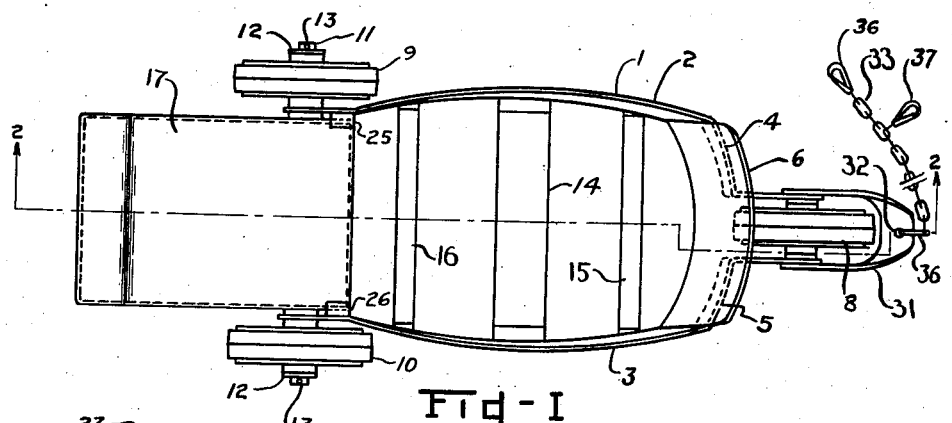
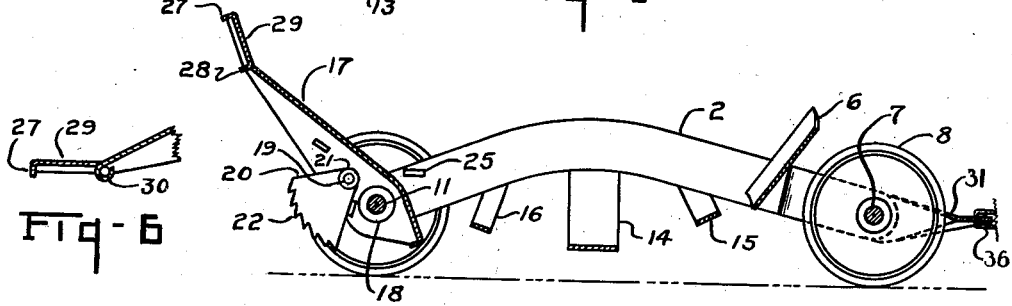
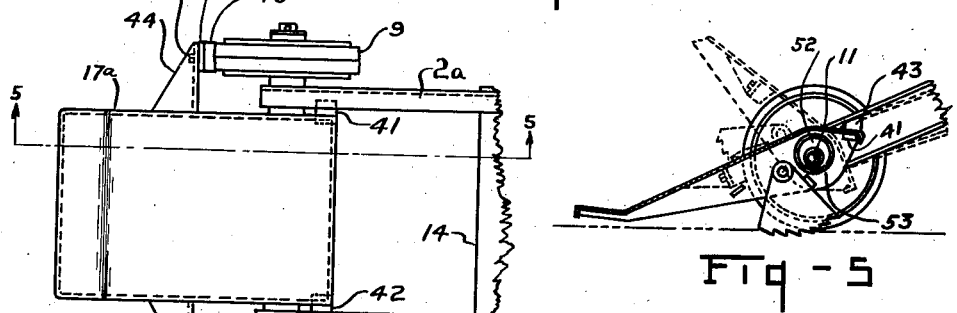
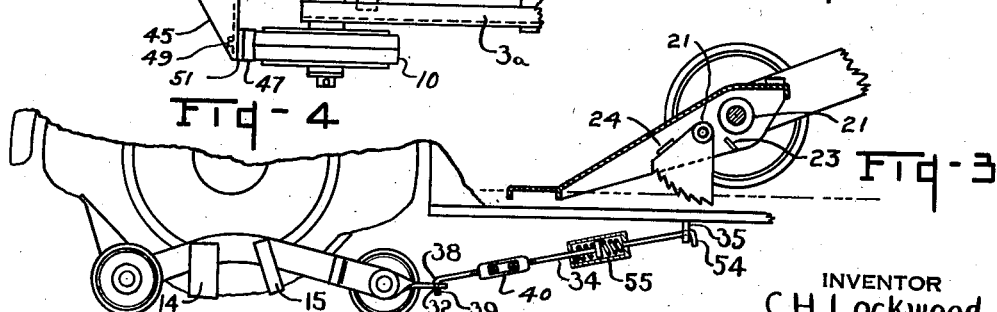
INVENTOR
C. H. Lockwood
BY Roy A. Plant
ATTORNEY Patented Sept. 26, 1944

2,358,864

UNITED STATES PATENT OFFICE 2,358,864

WHEEL TRUCK

Charles H. Lockwood, Battle Creek, Mich.

Application January 12, 1942, Serial No. 426,371

17 Claims. (Cl. 280—61)

The present invention relates broadly to wheeled trucks, and in its specific phases to a truck particularly adapted to have an automobile wheel loaded thereon and supported thereby for transportation while the wheel is still in place on the automobile.

When an automobile tire goes flat on the highway, the standard practice is to remove the flat tire and replace same with a spare tire which is normally carried for this purpose. The changing of tires in this manner is well-recognized to be hazardous, and particularly so due to passing traffic. In any event the changing of tires is a dirty job which is not relished by motorists. As a matter of eliminating the necessity of changing flat tires on the highway, a few attempts have been made to provide a wheel truck onto which an automobile wheel carrying the flat tire can be driven. With the wheel thus mounted, the automobile is then in condition to proceed slowly to a suitable garage or tire repair station with the disabled wheel carried by the wheel truck. This procedure demonstrated that in attempting to load a wheel onto a wheel truck, the latter would normally push ahead of the wheel and make the loading difficult if not impossible. To overcome this, digging members were sometimes provided on the end of the tail gate, and in one instance a narrow wedge-shaped block was used as a tail gate. This tail gate also functioned to lift the rear wheels of the truck slightly off of the ground to reduce the forward traction tendency of the assembly under loading conditions. This latter procedure was found to be relatively ineffective since on hard surfaces the tail gate would readily slide forward under loading conditions, and on softer surfaces it would sink into the ground sufficiently to permit the rear wheels of the wheel truck to contact the ground and again facilitate forward movement. The digging type of tail gates were likewise ineffective on hard surfaces. When the flat tire was on a rear wheel it was also found that the loading would have to be slow or the wheel truck would be kicked out from in under the wheel, and also that the same thing would happen in driving with the flat tire wheel on the truck unless the automobile was driven very carefully and slowly. Recognition of the disadvantages of changing tires on the highway and the shortcomings of the few wheel truck constructions proposed to overcome this difficulty led to the discovery and development of the present invention.

Accordingly among the objects of the present invention is the provision of an improved type of wheel truck onto which a wheel may be readily driven and supported with the wheel chocked in place for transportation.

Another object is to provide a wheel truck with the axles of same welded to the metal frame side members to give rigidity to the assembly without the necessity of cross-bracing same.

Another object is to provide a wheel truck on which it is easy to mount a wheel, and after mounting, the turning of corners or the like is readily accomplished.

A further object is to provide a wheel truck with means for lifting all of its wheels off of the ground as soon as the automobile wheel starts up the ramp-type tail gate which is provided at the rear of the assembly.

A further object is to provide a wheel truck which not only lifts all of the wheels off of the ground at the starting of loading a wheel thereon, but also applies brakes to the rear wheels of the wheel truck so that if the assembly sinks into the ground, under mounting conditions, to the point where the rear wheels contact the ground, the brakes will still hold same against rotation and thus facilitate completing the loading operation.

A further object is to provide an eccentric mounting for the ramp-type tail gate so that when the tail gate is down, brakes will be applied to the rear wheels and when the tail gate is up, the brakes will be released.

A further object is to provide pivotally mounted toothed elevator members on the under face of the tail gate to facilitate elevation of the wheel carrying portion of the assembly from the ground while the wheel to be loaded is moving up the ramp-type tail gate.

A further object is to make the toothed face of the elevators substantially of open cam shape so that any forward movement of the assembly will be resisted and under loading conditions will cause a further moderate elevation of the wheel carrying portion of the assembly to compensate for lowering of the assembly due to the elevators sinking into the ground under the weight of the wheel on the ramp-type tail gate.

A further object is to provide the ramp-type tail gate with stop members for the toothed elevators to further facilitate the operation and holding power of the elevators.

A further object is to provide means for holding the wheel truck, with a front or rear wheel of an automobile mounted thereon, against being knocked or kicked out from in under the wheel when the automobile is being driven.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing:

Figure 1 shows a top view of one preferred form of the present invention.

Figure 2 is a longitudinal vertical section view taken along the line 2—2 of Figure 1 looking in the direction of the arrows, but with the tail gate in elevated position which it normally takes when an automobile wheel has been loaded on the assembly.

Figure 3 shows a fragmentary section view of the rear portion of the assembly of Figure 2, but with the tail gate in lowered position and the wheel carrying frame portion elevated so that all of the wheels are off of the ground.

Figure 4 is a fragmentary top view of the rear portion of another preferred form of the present invention and involves the use of brakes for the rear wheels of the assembly.

Figure 5 is a fragmentary section view taken along line 5—5 of Figure 4 looking in the direction of the arrows.

Figure 6 shows a fragmentary longitudinal section view of a ramp-type tail gate having a hinged end portion.

Figure 7 shows a side elevation of one form of the present invention with an automobile rear wheel mounted thereon.

Referring more particularly to Figures 1, 2, and 3, of the drawing, the wheel truck here illustrated is provided with a frame 1 preferably formed of strap iron bent to form side members 2 and 3. The front portion of each of these frame members is preferably provided with inward projections 4 and 5 to which a portion of front end member 6 may be fastened so that the latter not only acts as an end member, but also to impart added rigidity to the front end of the assembly. The side members 2 and 3 at the inner ends of projections 4 and 5 may extend forward as shown and be joined by means of axle 7 on which is mounted wheel 8. While a removable axle may be used if desired, a more rigid assembly is produced by mounting the wheel and axle in place and then welding the axle to the front end of projecting members 4 and 5. These projecting members may be drilled to receive the axle and facilitate welding the two together at the outer face of the frame. The invention is not limited to the use of one front wheel since a plurality of wheels may be used at this point if desired, and the drawing is intended to diagrammatically indicate the use of one or more wheels at the front end of the assembly, and moreover same may be of either fixed or castor construction. The use of one wheel at the front of the assembly has the decided advantage of making steering easier when same has a front wheel of an automobile mounted thereon. The rear wheels 9 and 10 are mounted on rear axle 11. Each of these wheels may be held in place in conventional manner by the use, for instance, of a washer 12 and cotter key 13. Rear axle 11 is anchored to the rear end of side frame members 2 and 3 in conventional manner, and preferably by means of welding to impart further rigidity to the assembly when same has a metal frame. For the purpose of reducing friction and wear, all of the wheels will normally be provided with suitable greasing connections (not shown).

In order to support a disabled wheel when mounted on the truck of the present invention, the latter is preferably provided with a supporting strap 14 of general U-shape, the upper ends of the supporting strap being welded or otherwise fastened to the outer face of side members 2 and 3. Additional supporting straps may also be provided and preferably at least a forward supporting strap 15 and in some cases a rear supporting strap 16. These supporting straps will normally be fastened to side members 2 and 3 of the frame in similar manner to supporting strap 14. The use of supporting straps also acts to strengthen and make the assembly still more rigid.

The tail gate 17, which acts as a loading ramp, is pivotally mounted, preferably on rear axle 11, and the point of mounting may be reinforced by means of a collar 18 fastened on the tail gate at each side thereof. These collars will normally be welded to the sides of the tail gate, and if desired, may then be bored out in alignment to receive the axle before the latter is fastened in place. An auxiliary shaft 19 is mounted on the side flanges of the tail gate at a suitable point near but behind the rear axle when the tail gate is in lowered position. This auxiliary shaft has pivotally mounted thereon a pair of elevator members 20. Each of these elevator members, for simplicity of construction, may be held adjacent the side flanges of tail gate 17 by means of a conventional collar 21. The ground contacting face of these elevator members is preferably provided with teeth 22 which point slightly forward to improve the gripping or ground contact action of same. The distance from the pivot to the ground contacting face of these elevator members is made sufficiently great so that when the tail gate is completely down, these elevator members will act as fulcrumed supports to lift the rear wheels of the assembly off of the ground as typically shown in Figure 3 of the drawing. These elevator members are also preferably made with their ground contacting face of cam shape, and in some cases substantially arcuate with a radius greater than the distance to the pivot mounting, so that the forward edge of each elevator member will be a little longer than the vertical distance from the pivot to the lower face of the elevator member when same hangs freely. Under these conditions if the assembly tends to move forward as a wheel is being loaded thereonto, these elevator members will move on their pivots and due to the shape of their ground contacting face, will normally elevate the rear wheels slightly further above the ground to compensate for any settling of the elevator members into the ground due to the load being placed thereon. At the same time this additional elevating effect, due to forward sliding, will present a resistance to such sliding and help hold the assembly in place throughout the loading procedure. Backstops 23 and 24 act to limit the forward and back swinging of the elevator members. The rear backstop 24 is placed so as to stop the pivotal movement of the respective elevator members at a predetermined point, and hold some so as to resist further forward movement. This construction thus lifts the rear wheels off of the ground under normal loading conditions, and hence largely reduces the tendency of apparatus of this type to push forward under wheel loading conditions.

To further increase the resistance of the assembly to forward movement under loading conditions, a pair of stop members 25 and 26 are provided on the inner faces of the frame side members 2 and 3 so that just before the rear end of the tail gate reaches the ground, the forward end of the tail gate will engage stop members 25 and 26, and as the trailing edge of the tail gate is further lowered, this engagement will elevate the frame 1 of the assembly and lift front wheel 8 off of the ground. Under these conditions, all of the wheels will be off of the ground under loading conditions, a thing which not only eliminates forward rolling due to wheels, but also places extra weight on the elevator members with the result that they grip the ground still more firmly and with greater resistance to forward pushing.

The under face of the rear or trailing end of the tail gate 17 (Figure 2) is also preferably provided with a gripping member or members 27 and 28 which, in preferred form, are somewhat comb-like with teeth down to facilitate gripping action. If desired, the tail gate may have its trailing portion 29 (Figure 6) connected to the body portion of the tail gate by means of a hinge 30. This construction presents the advantages of good gripping action and, due to the downward folding of the trailing portion 29 when the tail gate is in its upper position, it provides a shorter projection tail gate for clearing fenders or the like when the automobile wheel is fully loaded on the assembly.

In preferred construction the apparatus is provided with a towing bracket 31 which is preferably welded to the front portion of projections 4 and 5 of side members 2 and 3. This bracket also helps to make the front end of the assembly more rigid. Directly in front of wheel 8 the towing bracket is provided with a perforation 32 to which a suitable restraining member such as an adjustable length chain 33 (Figure 1) or adjustable length rod 34 (Figure 7) may be connected. The forward end of the adjustable chain or rod is adapted to be anchored to a suitable outer rigger bracket 35 mounted on the underside of the automobile running board or supporting bracket therefore. Where the chain is used, it is preferably provided with latch-type hooks 36 at both ends, and an intermediate latch-type hook 37 for use in adjusting the length of the chain to substantially the minimum required for operating the assembly in place under a wheel. Where a rod is used, it is provided on one end with a suitable fastening means 54 for detachably, but fixedly, engaging bracket 35, and with a hook means 38 at the other end for engaging perforation 32 in towing bracket 31. A cotter pin 39 or the equivalent may be used to prevent disengagement of hook means 38. The length of adjustable rod 34 may be suitably varied, for instance, by means of a turnbuckle 40, to fit the particular vehicle on which the wheel truck is used. Rod 34 may also have, as part thereof, an automatic member 55 which permits limited length variation of the rod assembly. In other words member 55 may include springs, rubber cushions, or the like, which permit limited automatic lengthening, shortening, or both, of the rod assembly as the occasion requires. Where adjustable rod 34 is to be used, the disabled wheel is carefully driven onto the wheel truck and then the adjustable rod hooked in place as shown in Figure 7. Under these conditions, the automobile can be driven forward or back and at much higher rates of speed than would be possible without the use of this rod or the like. Where an adjustable chain 33 is used in place of rod 34, this chain can be connected both to the towing bracket 31 and to the running board outer rigger bracket 35 before driving the disabled rear wheel onto the wheel truck. Under these conditions, the chain will prevent the wheel truck from being kicked out from under the wheel during the loading operation, as well as under forward driving conditions. For loading purposes, the chain is preferably left a little longer than will be used for driving conditions, and after loading the disabled rear wheel on the wheel truck, the length of the chain is adjusted by means of intermediate latch-type hook 37.

The construction shown in Figure 7, to avoid duplication of illustration, is intended to diagrammatically set forth the mounting of either a front or rear wheel of an automotive vehicle on a wheel truck. When a front wheel is mounted in this manner, the front end of the restraining member, for instance chain 30 or rod 34, will be suitably connected to the vehicle by an outer rigger bracket, or equivalent fastening means, on the automobile front bumper or other convenient member. The restraining member should be suitably adjustable to permit stabilizing the wheel truck under conditions of use while allowing moderate turning of the mounted front wheel of the automobile for steering purposes. The making of moderate turns will be greatly facilitated by the use of a member 55 in either the rod or chain type restraining members.

In loading a disabled wheel onto the wheel truck, it is driven onto ramp-type tail gate 17 which in preferred construction automatically lifts all of the wheels off of the ground. This tail gate has its forward end overhang axle 11 so that as soon as the disabled wheel starts to roll off of the tail gate and into the space between frame side members 2 and 3 of the assembly, this overhang will cause the rear end of the tail gate to elevate substantially to the position shown in Figure 2, to form a backstop for the disabled wheel. The raising of the tail gate at the same time lowers all of the wheel truck wheels onto the ground and lifts elevator members 20 so that the apparatus is ready for use as described.

Referring to Figures 4 and 5, the apparatus here illustrated utilizes steel channel frame members 2a and 3a, although the combination is not limited to that type of frame, since even a wooden frame of suitable construction may be used if desired. The tail gate 17a in this case may be provided with projecting lugs 41 and 42 adapted to engage suitable stop members 43 on the underside of the top flange of the frame side members. The lower flange of these two side members is suitably cut away to allow projecting lugs 41 and 42 to swing past same when the rear end of the tail gate is moved to elevated position. Mounted on each side of tail gate 17a are supporting bracket members 44 and 45 carrying brake shoes 46 and 47. These brake shoes are adjustably connected to their respective supporting members by means of cap screws 48, and 49, and shims 50, and 51. The rear axle 11 in this case has eccentric wheels 52 welded thereto so that sleeves 53 welded to each side of tail gate 17a will rotate thereover. By setting the center of eccentric wheels 52 above the center of axle 11 and preferably on a line slightly forward of perpendicular, for instance, approximately 20°, the brakes can be adjusted so as to start to grip the back face of the wheels to prevent them from rotating when the tail gate is moved downward and is just short of reaching the ground and the wheels are still in contact with same. Under these conditions, movement of the free or trailing end of the tail gate down to the ground will apply positive brake action to prevent rotation of the rear wheels. The moment that the trailing end of the tail gate moves to upper position as shown in dotted lines in Figure 5, the rotation of sleeves 53 around eccentric wheels 52 will move brake shoes 46 and 47 out of contact with rear wheels 9 and 10. The brake shoes may also be adjusted so as to cause the front wheel to be lifted off of the ground when the tail gate is in its lowermost position. By using brakes in connection with the rear wheels as shown, these wheels will be held against rotation even though elevator members 20 sing into the ground, under loading conditions, until the rear wheels are in tractive contact with the latter.

Other modes of applying the principles of my invention may be employed instead of those explained, change being made as regards the articles and combinations herein disclosed, provided the means stated by any of the following claims or the equivalent of such stated means be employed.

I therefore particularly point out and distinctly claim as my invention:

1. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, a pair of elevator members, and means for pivotally mounting said elevator members on said tail gate adjacent but behind said rear axle, the tail gate of said wheel truck, when the latter is ready for loading, having its trailing edge held in elevated position due to the elevators resting on the ground, said elevators cooperating with said tail gate so that when the trailing edge of same is depressed the elevators will act as supports, whereby the rear wheels will be elevated.

2. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, a pair of elevator members having toothed ground contacting faces, means for pivotally mounting said elevator members on said tail gate adjacent but behind said rear axle, and stop means for limiting the pivotal movement of said elevator members so that the ground contacting face of same is always in supporting position under the tail gate, the tail gate of said wheel truck, when the latter is ready for loading, having its trailing edge held in elevated position due to the elevators resting on the ground, said elevators cooperating with said tail gate so that when the trailing edge of same is depressed the elevators will act as supports, whereby the rear wheels will be elevated.

3. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, a pair of elevator members having toothed ground contacting faces, a pivot means, means for pivotally mounting said elevator members through said pivot means to said tail gate adjacent but behind said rear axle, and stop means for limiting the pivotal movement of said elevator members so that the ground contacting face of same is always in supporting position under the tail gate, said toothed ground contacting faces being elongated with the distance from the center of said pivot to the forward end of the ground contacting face greater than the distance from the center of said pivot to the point on said face normally directly below said pivot, whereby the lowering of the trailing edge of said tail gate into contact with substantially level ground acts through said pivoted elevator members as supports to lift the rear wheels off of the ground, and forward sliding of the wheel mounted frame under these conditions acts through said elevator members to normally lift the rear wheels still higher off of the ground.

4. A vehicle wheel carrying wheel truck which has a suitable fixed position towing connection member at the front end thereof, a restraining means connectable at one end to said towing connection member, means for suitably joining the other end of said restraining means to the vehicle whose wheel is mounted on said wheel truck, means for automatically varying the length of said restraining means over a limited range, and means for manually varying the length of said restraining means.

5. In a truck assembly having a frame, at least three supporting wheels suitably mounted on said frame, and a ramp-type tail gate pivotally connected to said frame for loading one wheel of a vehicle onto said assembly, the combination which comprises a suitable fixed position towing connection means at the front end of said truck assembly, an anchoring means on said vehicle in front of the wheel supported on said assembly, and rod means extending from said towing connection to said anchoring means and joined at its respective ends thereto, whereby said joining rod when suitably connected, is adapted to facilitate the carrying of said vehicle wheel on said truck assembly, and at the same time the rigidity of the rod acts to resist the forcing of said truck assembly from in under said vehicle wheel under either forward or backward movement of said vehicle.

6. In a truck assembly having a frame, and at least three supporting wheels suitably mounted on said frame, the combination which comprises a ramp-type tail gate pivotally connected to the rear end of said frame for loading one wheel of a vehicle onto said assembly, elevator members pivotally mounted on the under face of said tail gate, said elevator members being of a length and shape such that when the tail gate is completely lowered they will elevate the tail gate end of said wheel truck body, and if the wheel truck body moves forward with the tail gate and said elevator members on the ground, they will cause the tail gate end of said body to elevate still higher, and resist forward movement of the wheel truck body, a suitable fixed position towing connection means at the front end of said truck assembly, an anchoring means on said vehicle in front of the wheel supported on said assembly, and chain means for joining said towing connection to said anchoring means, said chain means having a shortening means connected thereto, whereby said joining chain, when suitably connected to said vehicle at one end and to said towing connection on said truck assembly at the other end, is adapted to facilitate the carrying of said vehicle wheel on said truck assembly, and at the same time, due to towing action, acts to prevent said truck assembly from being forced out backwards from in under said vehicle wheel under forward movement of said vehicle.

7. A wheel truck of the character described which is adapted for the loading and carrying of a vehicle wheel, which comprises a frame, at least one front wheel and two rear wheels for said truck, an axle for said rear wheels, said axle being mounted on said frame, a pivoted ramp-type tail gate mounted on said frame, a pair of elevator members, means for pivotally mounting said elevator members on said tail gate adjacent but behind said rear axle, means for connecting said tail gate and frame so that they move as a unit when said tail gate approaches the ground, a towing connection means at the front end of said truck assembly, an anchoring means on said vehicle in front of the wheel thereof supported on said assembly, an adjustable length chain means for joining said towing connection to said anchoring means, whereby said chain means, when suitably connected and adjusted, is adapted to prevent said truck assembly from being forced out backwards from in under said vehicle wheel under forward movement of said vehicle, and whereby the lowering of the trailing edge of said tail gate into contact with substantially level ground acts through said means connecting said tail gate and frame to move as a unit, and through said elevator members, as supports to lift all of the wheels of the wheel truck off of the ground, and thus facilitate loading the vehicle wheel onto said wheel truck.

8. A wheel truck of the character described, which comprises a frame, at least one front wheel and two rear wheels for said truck, an axle for said rear wheels, said axle being mounted on said frame, a pivoted tail gate mounted on said frame, a pair of elevator members, means for pivotally mounting said elevator members on said tail gate adjacent but behind said rear axle, and means for connecting said tail gate and frame so that they move as a unit when said tail gate approaches the ground, whereby the lowering of the trailing edge of said tail gate into contact with substantially level ground acts through said means connecting said tail gate and frame to move as a unit, and through said elevator members as supports, to lift all of the wheels of the wheel truck off of the ground.

9. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, a pair of elevator members having toothed ground contacting faces, means for pivotally mounting said elevator members on said tail gate adjacent but behind said rear axle, stop means for limiting the pivotal movement of said elevator members so that the ground contacting face of same is always in supporting position for the assembly, and means for connecting said tail gate and frame so that they move as a unit when the trailing edge of said tail gate approaches the ground, whereby the lowering of the trailing edge of said tail gate into contact with substantially level ground acts through said means connecting said tail gate and frame to move as a unit, and through said elevator members as supports, to lift all of the wheels of the wheel truck off of the ground.

10. In a truck assembly the combination with a frame, at least one front wheel and two rear wheels for said truck, and a ramp-type tail gate pivotally connected to said frame for loading a vehicle wheel or the like onto said assembly, of means for connecting said tail gate and frame so that they move as a relatively rigid unit when the trailing edge of said tail gate approaches the ground, whereby the lowering of the trailing edge of said tail gate to the ground acts to lift the end of the assembly, furthest from the tail gate, off of the ground.

11. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, and means cooperating with said tail gate for normally gripping said rear wheels against rotation when the tail gate is in lowered position.

12. A wheel truck of the character described, which comprises a frame, at least one front wheel and two rear wheels for said truck, an axle for said rear wheels, said axle being mounted on said frame, a tail gate, brakes mounted on said tail gate for engagement with said rear wheels, eccentric wheel means mounted on said rear axle, and means on said tail gate for pivotal movement of the latter on said eccentric wheel means, said eccentric wheel means and tail gate mounting thereon being arranged so that as said tail gate approaches the ground, said brakes will engage and normally hold the rear wheels against rotation, and when said tail gate is being elevated, said brakes will move away from the rear wheels and release same.

13. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, means for normally gripping said rear wheels against rotation when the tail gate is in lowered position, and means for connecting said tail gate and frame assembly so that they move as a unit when said tail gate approaches the ground, whereby the lowering of the trailing edge of said tail gate to the ground normally causes said rear wheels to be gripped against rotation and the front end of the assembly to be lifted off of the ground.

14. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, a pair of elevator members, means for pivotally mounting said elevator members on said tail gate adjacent but behind said rear axle, and means for normally gripping said rear wheels against rotation when the tail gate is in lowered position, whereby the lowering of the trailing edge of said tail gate to the ground acts through said pivoted elevator members as supports to normally lift the rear wheels of the wheel truck off of the ground, while said gripping means normally holds said wheels against rotation even though the loading of said wheel truck forces said elevator members into the ground sufficiently to bring said rear wheels into contact with same prior to raising the tail gate.

15. A wheel truck of the character described, which comprises a frame, at least one front wheel and two rear wheels for said truck, an axle for said rear wheels, said axle being mounted on said frame, a tail gate, means for mounting said tail gate for pivotal movement relative to said axle, a pair of elevator members, means for pivotally mounting said elevator members on said tail gate adjacent but behind said rear axle, means for gripping said rear wheels against rotation when the tail gate is in lowered position, and means for connecting said tail gate and frame so that they move as a unit when said tail gate approaches the ground, whereby the lowering of the trailing edge of said tail gate to the ground acts through said means which connects said tail gate and frame to move as a unit, and through said elevators as supports, to lift all of the wheels of the wheel truck off of the ground, and at the same time said gripping means normally holds said wheels against rotation even though the loading of said wheel truck forces said elevator members into the ground sufficiently to bring said rear wheels into contact with same prior to raising the tail gate.

16. A wheel truck which has a body with a pivoted tail gate, elevator members pivotally mounted on the under face of said tail gate, said elevator members being of a length and shape such that, when the tail gate is completely lowered, they will elevate the tail gate end of said wheel truck body, and if the wheel truck body moves forward with the tail gate and said elevator members on the ground, they will cause the tail gate end of said body to elevate still higher, and resist forward movement of the wheel truck body.

17. A wheel truck which has a body with a pivoted tail gate, elevator members pivotally mounted on the under face of said tail gate, said elevator members being of a length and shape such that, when the tail gate is completely lowered, they will elevate the tail gate end of said wheel truck body, and if the wheel truck body moves forward with the tail gate and said elevator members on the ground, they will cause the tail gate end of said body to elevate still higher, and resist forward movement of the wheel truck body, said tail gate having an overhanging forward portion such that when a wheel is loaded onto said wheel truck, the wheel will contact said overhanging portion and depress it so as to elevate the opposite end of the tail gate to an upwardly inclined angle forming a backstop for the loaded wheel.

CHARLES H. LOCKWOOD.